United States Patent
Kim et al.

(10) Patent No.: US 11,554,571 B2
(45) Date of Patent: Jan. 17, 2023

(54) DECORATIVE PRINT MEMBER AND DISPLAY DEVICE INCLUDING THE SAME

(71) Applicant: Samsung Display Co., Ltd., Yongin-si (KR)

(72) Inventors: Min Su Kim, Seongnam-si (KR); Ji Young Wang, Asan-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 85 days.

(21) Appl. No.: 15/842,634

(22) Filed: Dec. 14, 2017

(65) Prior Publication Data
US 2018/0370183 A1   Dec. 27, 2018

(30) Foreign Application Priority Data
Jun. 23, 2017   (KR) .................. 10-2017-0079838

(51) Int. Cl.
*B32B 3/30* (2006.01)
*B41M 3/00* (2006.01)

(52) U.S. Cl.
CPC .............. *B32B 3/30* (2013.01); *B41M 3/00* (2013.01); *B32B 2307/412* (2013.01);
(Continued)

(58) Field of Classification Search
CPC ........ B32B 17/10256; B32B 17/10266; B32B 17/10275; B32B 17/10284;
(Continued)

(56) References Cited

U.S. PATENT DOCUMENTS 9,676,162 B2   6/2017   Park
9,905,804 B2   2/2018   Tang
(Continued)

FOREIGN PATENT DOCUMENTS

CN   1438260 A   *   8/2003   ............... C08J 7/04
CN   201566384 U       9/2010
(Continued)

OTHER PUBLICATIONS

First Office Action of Chinese Patent Application No. 201810257819.4, dated Jun. 2, 2021, 9 Pages.
(Continued)

*Primary Examiner* — Maria V Ewald
*Assistant Examiner* — Ethan Weydemeyer
(74) *Attorney, Agent, or Firm* — Lewis Roca Rothgerber Christie LLP

(57) ABSTRACT

A decorative print member and a display device including the decorative print member are provided. The decorative print member includes a base layer, a first decorative print pattern disposed on the base layer, and a shielding layer disposed over the first decorative print pattern. The first decorative print pattern includes a first decorative print layer disposed on the base layer, and a second decorative print layer disposed on the first decorative print layer. The shielding layer covers upper and side surfaces of the second
(Continued)

decorative print layer, and a side surface of the first decorative print layer protrudes outwardly from the side surface of the second decorative print layer and a side surface of the shielding layer.

20 Claims, 10 Drawing Sheets

(52) U.S. Cl.
CPC ..... *B32B 2307/416* (2013.01); *B32B 2307/75* (2013.01); *B32B 2457/20* (2013.01)

(58) Field of Classification Search
CPC .......... B32B 2457/20; B32B 2457/202; B32B 2457/204; B32B 2457/206; B32B 3/30; G02F 1/133308; G02F 1/133338; G02F 1/133514; G02F 2001/133331; Y10T 428/24752; B41M 3/00
USPC .......................................... 428/189, 192–194
See application file for complete search history.

(56) References Cited

U.S. PATENT DOCUMENTS

| | | |
|---|---|---|
| 10,038,165 B2 | 7/2018 | Tang |
| 10,073,290 B2 | 9/2018 | Jin |
| 10,156,663 B2 | 12/2018 | Jang |
| 2014/0139758 A1* | 5/2014 | Jian ........................ G06F 3/0412 349/12 |
| 2015/0029419 A1* | 1/2015 | Huang .................... G09F 23/00 349/12 |
| 2016/0221293 A1* | 8/2016 | Park ........................ B32B 37/14 |

FOREIGN PATENT DOCUMENTS

| | | |
|---|---|---|
| CN | 203465692 U | 3/2014 |
| CN | 104345973 A | 2/2015 |
| CN | 204184116 U | 3/2015 |
| CN | 104750297 A | 7/2015 |
| CN | 104898874 A | 9/2015 |
| CN | 204990240 U | 1/2016 |
| CN | 105320342 A | 2/2016 |
| CN | 105938873 A | 9/2016 |
| KR | 10-2016-0028595 | 3/2016 |
| KR | 10-2016-0053061 A | 5/2016 |
| KR | 10-2016-0093173 A | 8/2016 |
| KR | 10-2016-0096241 A | 8/2016 |

OTHER PUBLICATIONS

Chinese Office Action dated Dec. 24, 2021, for Application No. 201810257819.4, 10 pages.

* cited by examiner

DECORATIVE PRINT MEMBER AND DISPLAY DEVICE INCLUDING THE SAME

CROSS-REFERENCE TO RELATED APPLICATIONS

This application claims priority to and the benefit of Korean Patent Application No. 10-2017-0079838, filed on Jun. 23, 2017 in the Korean Intellectual Property Office, the disclosure of which is incorporated herein by reference in its entirety.

BACKGROUND

1. Field

One or more aspects of example embodiments of the present disclosure relate to a decorative print member and a display device including the decorative print member.

2. Description of the Related Art

A decorative print member is used to represent colors or patterns, and may be applied to a window of a display device to hide a non-display area of the display device and to provide aesthetic effects. In addition, decorative print members can find a variety of applications including interior accessories in buildings such as windows, wallpaper and furniture, advertising articles such as signs and banners, and electronic products such as refrigerators and microwave ovens.

A decorative print member is typically formed by coating a decorating ink on a substrate. When the decorative print member is subjected to an external impact, the decorating ink layer is often peeled off from an edge of the substrate (e.g., the decorative print member becomes at least partially delaminated from the substrate). When this happens, the aesthetic effects deteriorate, and also the display quality may be affected when such decorative print members are used in a display device.

SUMMARY

Aspects of embodiments of the present disclosure provide a decorative print member that can be reliably attached on a target object.

Aspects of embodiments of the present disclosure also provide a display device having a decorative print member reliably attached thereon.

According to aspects of embodiments of the inventive concept, there is provided a decorative print member including a base layer, a first decorative print pattern disposed on the base layer, and a shielding layer disposed over the first decorative print pattern. The first decorative print pattern includes a first decorative print layer disposed on the base layer, and a second decorative print layer disposed on the first decorative print layer. The shielding layer covers upper and side surfaces of the second decorative print layer, and a side surface of the first decorative print layer protrudes outwardly from the side surface of the second decorative print layer and a side surface of the shielding layer.

According to aspects of embodiments of the inventive concept, there is provided a display device including a display panel configured to display an image, and a window opposite to the display panel, the window including a display area for transmitting an image generated by the display panel and a non-display area surrounding the display area. The window includes a transparent substrate, a first decorative print pattern disposed on the transparent substrate in the non-display area, and a shielding layer disposed over the first decorative print pattern. The first decorative print pattern includes a first decorative print layer disposed on the transparent substrate, and a second decorative print layer disposed on the first decorative print layer. The shield layer covers an upper surface and an outer side surface of the second decorative print layer, and an outer side surface of the first decorative print layer protrudes outwardly more than the outer side surface of the second decorative print layer and an outer side surface of the shielding layer.

According to some embodiments of the present disclosure, a decorative print member can be reliably attached on a target object. Accordingly, the decorative print layer is less likely to be peeled off from the target object even if an external impact is applied.

According to some embodiments of the present disclosure, it is possible to avoid an error in recognizing a decorative print member (e.g., during processing) due to reflection of external light on a decorative print layer.

BRIEF DESCRIPTION OF THE DRAWINGS

The above and other aspects and features of the present disclosure will become more apparent by reference to the following detailed description when considered in conjunction with the attached drawings, in which.

DETAILED DESCRIPTION

Figure 1:
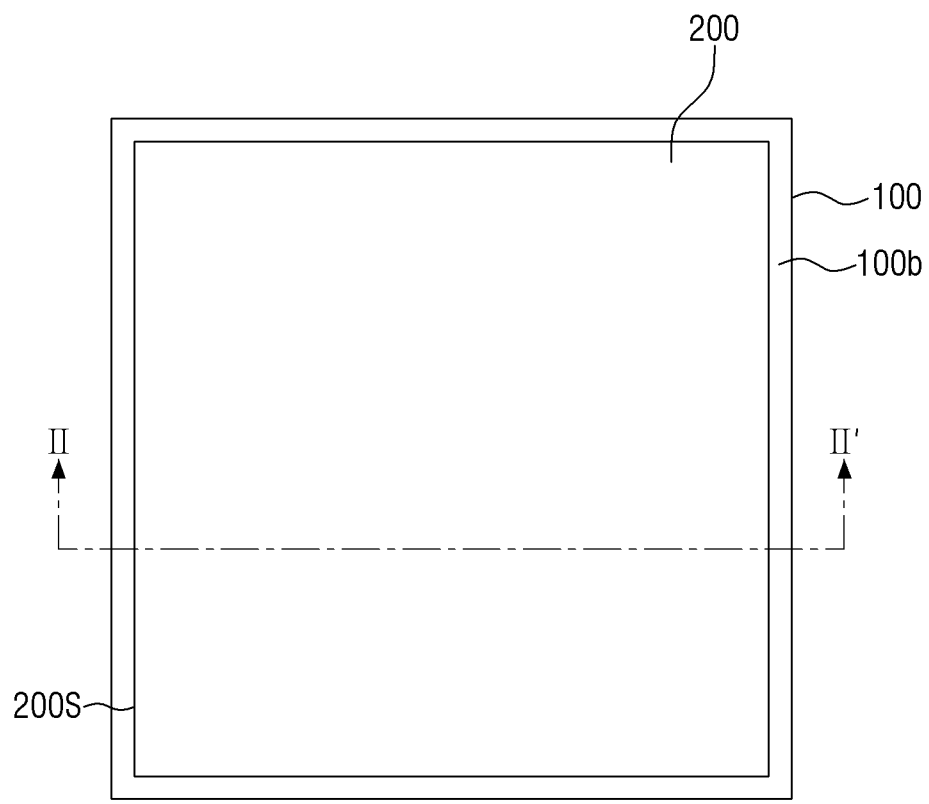
FIG. 1 is a plan view of a decorative print member according to some embodiments of the present disclosure.

Hereinafter, example embodiments will now be described in more detail with reference to the accompanying drawings, in which like reference numbers refer to like elements throughout. The present invention, however, may be embodied in various different forms, and should not be construed as being limited to only the illustrated embodiments herein. Rather, these embodiments are provided as examples so that this disclosure will be thorough and complete, and will fully convey the aspects and features of the present invention to those skilled in the art. Accordingly, processes, elements, and techniques that are not necessary to those having ordinary skill in the art for a complete understanding of the aspects and features of the present invention may not be described. Unless otherwise noted, like reference numerals denote like elements throughout the attached drawings and the written description, and thus, descriptions thereof will not be repeated. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

In the drawings, thicknesses of a plurality of layers and areas are illustrated in an enlarged manner for clarity and ease of description thereof.

Spatially relative terms such as "below", "beneath", "lower", "above", "upper" and the like, may be used herein for ease of description to describe the relations between one element or component and another element or component as illustrated in the drawings. It will be understood that the spatially relative terms are intended to encompass different orientations of the device in use or operation, in addition to the orientation depicted in the drawings. For example, in the case where a device illustrated in the drawing is turned over, the device positioned "below" or "beneath" another device may be placed "above" another device. Accordingly, the example terms "below" and "under" may include both an orientation of above and below.

It will be further understood that the terms "comprises," "comprising," "includes" and/or "including," when used in this specification, specify the presence of stated features, integers, steps, operations, elements and/or components, but do not preclude the presence or addition of one or more other features, integers, steps, operations, elements, components and/or groups thereof.

It will be understood that when a layer, area, element, or plate is referred to as being "on," "connected to," or "coupled to" another layer, area, or plate, it may be directly on, connected, or coupled to the other layer, area, element, or plate, or intervening layers, areas, elements, or plates may be present therebetween. Conversely, when a layer, area, element, or plate is referred to as being "directly on," "directly connected to," or "directly coupled to" another layer, area, element, or plate, there are no intervening layers, areas, elements or plates therebetween. In addition, it will also be understood that when a layer, area, element, or plate is referred to as being "between" two layers, areas, elements, or plates, it can be the only layer, area, element, or plate between the two layers, areas, elements, or plates, or one or more intervening layers, areas, elements, or plates may also be present. Further when a layer, area, element, or plate is referred to as being "below" another layer, area, element, or plate, it may be directly below the other layer, area, element, or plate, or intervening layers, areas, elements, or plates may be present therebetween. Conversely, when a layer, area, or plate is referred to as being "directly below" another layer, area, element, or plate, intervening layers, areas, elements, or plates may be absent therebetween.

As used herein, the terms "substantially," "about," "approximately" and similar terms are used as terms of approximation and not as terms of degree, and are intended to account for the inherent deviations in measured or calculated values that would be recognized by those of ordinary skill in the art. Further, these terms as used herein are inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

It will be understood that, although the terms "first," "second," "third," and the like may be used herein to describe various elements, components, regions, layers and/or sections, these elements, components, regions, layers and/or sections should not be limited by these terms. The use of the terms first, second, etc. do not denote any order or importance, but rather the terms first, second, etc. are used to distinguish one element from another element. Thus, a first element, component, region, layer, or section discussed below could be termed a second element, component, region, layer or section without departing from the teachings herein.

Unless otherwise defined, all terms used herein (including technical and scientific terms) have the same meaning as commonly understood by those skilled in the art to which this invention pertains. It will be further understood that terms, such as those defined in commonly used dictionaries, should be interpreted as having a meaning that is consistent with their meaning in the context of the relevant art and will not be interpreted in an ideal or excessively formal sense unless clearly defined in the present specification.

Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

Expressions such as "at least one of," when preceding a list of elements, modify the entire list of elements and do not only modify the individual elements of the list. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Figure 2:
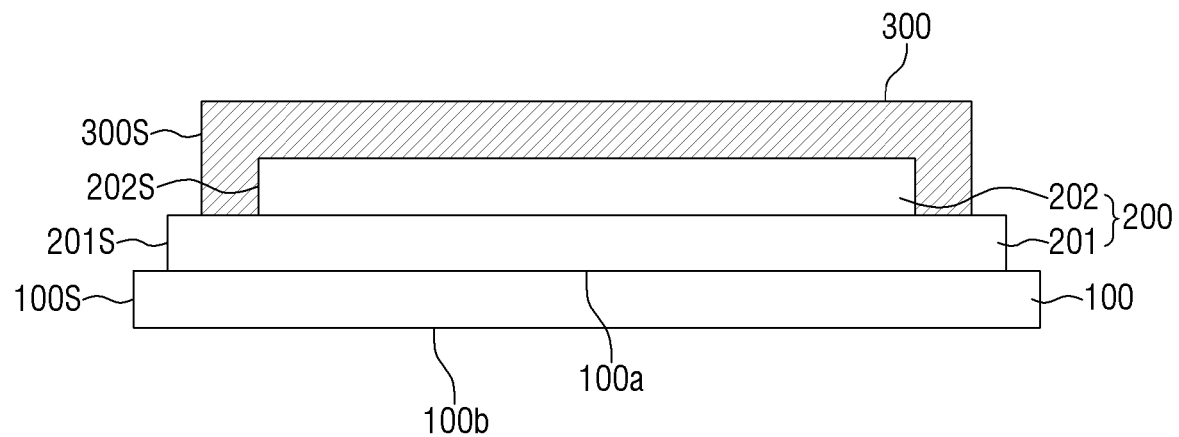
FIG. 2 is a cross-sectional view taken along line II-II' of FIG. 1.
Figure 3:
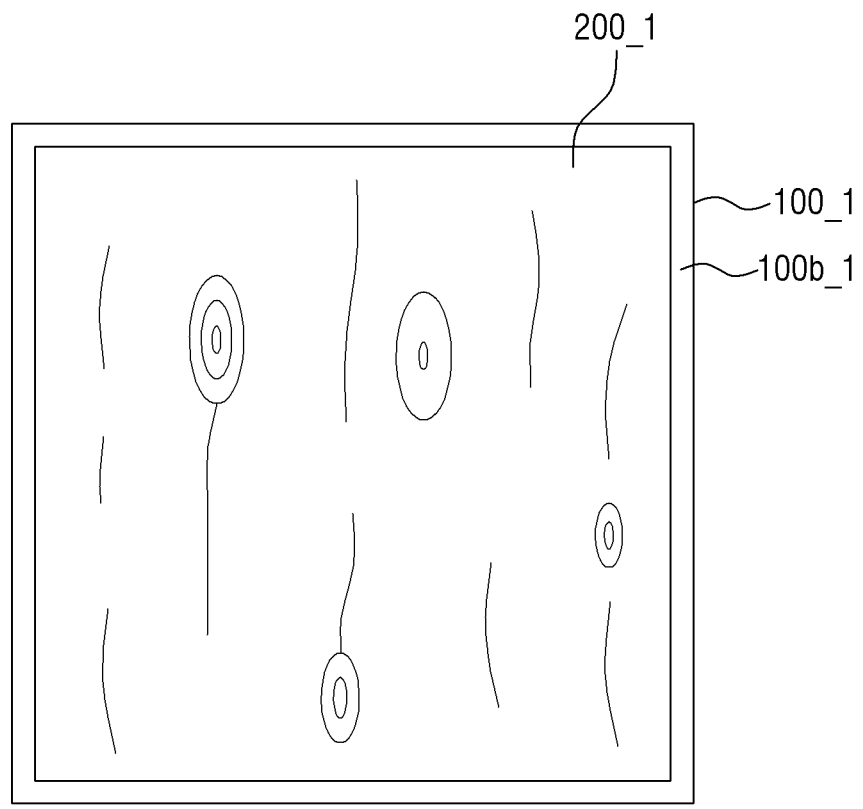
FIG. 3 is a plan view of an example of a decorative print member according to some embodiments of the present disclosure.

FIG. 1 is a plan view of a decorative print member according to some embodiments of the present disclosure (e.g., viewed from surface 100b). FIG. 2 is a cross-sectional view taken along line II-II' of FIG. 1. FIG. 3 is a plan view of an example of a decorative print member according to some embodiments of the present disclosure (e.g., viewed from surface 100_2b).

Referring to FIGS. 1 and 2, a decorative print member 10 includes a base layer 100, a first decorative print pattern 200 formed on the base layer 100, and a shielding layer 300 covering the first decorative print pattern 200.

In some embodiments, the base layer 100 may have a rectangular shape. However, this is merely illustrative, and the shape of the base layer 100 is not limited thereto or thereby. The base layer 100 may have various disclosed structures or shapes. For example, the base layer may have a polygonal shape such as a triangle, a square and the like, or a circular shape, or may have a closed curve shape of a continuous strip depending on implementations. In the embodiments depicted in FIGS. 1 and 2, the base layer 100 has a rectangular surface shape.

As shown in FIG. 2, the base layer 100 may include a first surface 100a with the first decorative print pattern 200 thereon, and an opposite second surface 100b. The first decorative print pattern 200 may be printed directly on the base layer 100 or may be made of a film sheet and then attached to the base layer 100 by an adhesive layer or the like.

The base layer 100 may include a transparent material. For example, the base layer 100 may have such a transmittance that when viewed from the second surface 100b, a viewer can see the first decorative print pattern 200 disposed on the first surface 100a of the base layer 100 through the base layer 100. The base layer 100 may be made of, for example, transparent glass, polyethylene terephthalate, polyvinyl resin, polyester, or the like. However, this is merely illustrative, and the material of the base layer 100 is not limited thereto or thereby. The base layer 100 may be made of various suitable materials as long as the base layer 100 can support the first decorative print pattern 200 and has a sufficient transmittance to allow the first decorative print pattern 200 to be seen (e.g., when viewed through the base layer 100).

The first decorative print pattern 200 may have a variety of shapes on the base layer 100. Although the first decorative print pattern 200 in FIGS. 1-2 is shown as having a surface shape that almost fills the surface shape of the base layer 100 (e.g., the surface area of the first decorative print pattern 200 is depicted as covering almost all of the surface area of the base layer 100), this is merely illustrative, and the shape of the base layer 100 is not limited thereto or thereby.

As shown in FIGS. 1-2, the base layer 100 has side surfaces 100S and the first decorative print pattern 200 has side surfaces 200S. In some embodiments, at least one of the side surfaces 200S of the first decorative print pattern 200 may be aligned with the respective side surfaces 100S of the base layer 100. When the first decorative print pattern 200 is made up of a plurality of layers, the side surface 200S of the first decorative print pattern 200 may be defined by connecting the most protruding portions of the plurality of layers stacked thereon.

In some embodiments, the side surface 200S of the first decorative print pattern 200 may be located more to the inside than the side surface of the base layer 100 (e.g., a maximum width of the base layer 100 may be greater than a maximum width of the first decorative print pattern 200). That is, the side surface 100S of the base layer 100 may protrude outwardly from the side surface 200S of the first decorative print pattern 200.

The first decorative print pattern 200 may be represented in achromatic colors such as white, gray and black or chromatic colors such as red, blue and green. Further, as shown in FIG. 3, the first decorative print pattern 200_1 of the decorative print member 10_1 may have, but is not limited to, a wood pattern. In other implementations, the first decorative print pattern 200, 200_1 may have various patterns such as a metal texture. As described above, the first decorative print patterns 200, 200_1 impart colors and various textures to the decorative print members 10, 10_1, thereby improving aesthetic effects.

The first decorative print pattern 200 may include a plurality of decorative print layers stacked on one another. In some embodiments, the first decorative print pattern 200 may include a first decorative print layer 201 and a second decorative print layer 202 (see FIG. 2). It is to be understood that this is merely illustrative and the first decorative print pattern 200 may include three or more decorative print layers. The plurality of decorative print layers 201 and 202 may be formed in the same color. When a plurality of decorative print layers 201 and 202 are formed having the same color, clearer color can be represented (e.g., the two layers having the same color may provide a richer and more solid full color than a single layer alone). For example, when two-color printing is performed, two decorative print layers of the same color are stacked, which shows a clearer (e.g., fuller) color than one-color printing with a single decorative print layer. Likewise, when three-color printing is performed, the three decorative print layer of the same color may be stacked.

The first decorative print pattern 200 may include decorative print layers of different colors. For example, when the first decorative print layer 201 is pink, the second decorative print layer 202 may be formed in white so that the first decorative print layer 201 can be more clearly represented.

The decorative print layers 201 and 202 may have the same thickness as shown in FIG. 2. However, this is merely illustrative, and the thicknesses of the print layers are not limited thereto or thereby. The plurality of decorative print layers 201 and 202 may have different thicknesses from each other as desired. In other words, when the first decorative print pattern 200 is viewed from the second surface 100b of the base layer 100 and through the base layer 100, the decorative print layers 201 and 202 may be formed with the optimal combination of thicknesses in order to represent a desired color.

The first decorative print layer 201 is disposed on the first surface 100a of the base layer 100. The first decorative print layer 201 can be seen through the base layer 100 when viewed from the second surface 100b and through the base layer 100. The first decorative print layer 201 may be disposed directly on the first surface 100a of the base layer 100 or a variety of members such as an adhesive element or a primer may be interposed between the base layer 100 and the first decorative print layer 201.

The side surface 201S of the first decorative print layer 201 may be located more to the inside than the side surface 100S of the base layer 100 (e.g., my protrude further inwards). This is, however, merely illustrative. At least a part of the side surface 201S of the first decorative print layer 201 may be aligned with the side surface 100S of the base layer 100 (e.g., the side surface 201S may be coplanar with the side surface 100S). In some embodiments, when the first decorative print layer 201 includes two opposed side surfaces 201S, one of the side surfaces 201S may be located more to the inside than the corresponding side surface 100S of the base layer 100 (e.g., a side surface 100S may protrude outwardly from a corresponding side surface 201S), while the other one of the side surfaces 201S may be aligned with (e.g., coplanar with) the corresponding side surface 100S of the base layer 100.

The second decorative print layer 202 may be disposed on the first decorative print layer 201. The second decorative print layer 202 may generally overlap with the first decorative print layer 201 and may have a shape conforming to the shape of the first decorative print layer 201. It is to be noted that the side surfaces 202S of the second decorative print layer 202 may be located more to the inside than the respective side surfaces 201S of the first decorative print layer 201. That is, the side surfaces 202S of the second decorative print layer 202 may be located on the upper surface of the first decorative print layer 201. In other words, the side surfaces of the first decorative print layer 201 may protrude outwardly from the respective side surfaces of the second decorative print layer 202. Therefore, the first decorative print layer 201 may include a first portion overlapping with the second decorative print layer 202 as well as a second portion not overlapping with the second decorative print layer 202 (hereinafter referred to as non-overlapping portion). The width of the first decorative print layer 201 may be larger than the width of the second decorative print layer 202, and the side surfaces of the first decorative print pattern 200 may be formed generally in a stairs-like shape.

The side surface 202S of the second decorative print layer 202 may be spaced apart from the side surface 100S of the base layer 100 in the horizontal direction more than the side surface 201S of the first decorative print layer 201 is spaced apart from the side surface 100S of the base layer 100. For example, the side surface 202S of the second decorative print layer 202 may be spaced apart (e.g., horizontally) from the side surface 100S of the base layer 100 by approximately 0.5 mm, while the side surface 201S of the first decorative print layer 201 may be spaced apart (e.g., horizontally) from the side surface 101S of the base layer 100 by approximately 0.1 mm.

The side surfaces 200S of the first decorative print pattern 200 have a stairs-like shape as described above. Therefore, when the first decorative print pattern 200 is viewed from the second surface 100b and through the base layer 100, the second decorative print layer 202 is not directly seen but is indirectly seen through the first decorative print layer 201. When the decorative print member 10 is viewed from the second surface 100b and through the base layer 100, the area where the first decorative print layer 201 overlaps with the second decorative print layer 202 and the area where only the first decorative print layer 201 exists (e.g., the non-overlapping portion) may be seen differently. The areas where the first decorative print layer 201 overlaps with the second decorative print layer 202 may be seen to be darker than the areas where they do not overlap.

A shielding layer 300 may be disposed on the first decorative print pattern 200. The shielding layer 300 absorbs light incident from the first surface 100a of the base layer 100 in advance and prevents incident light from leaking through the first decorative print pattern 200 and the base layer 100. Therefore, even if light of various wavelengths is incident from one side of the decorative print member 10, the color represented by the first decorative print pattern 200 is not affected and the original color can be maintained.

The shielding layer 300 may have a shape conforming to the shape of the first decorative print pattern 200. The shielding layer 300 may cover the entire upper surface of the second decorative print layer 202 and extend outwardly to cover the side surfaces 202S of the second decorative print layer 202. The upper surface and the side surfaces 202S of the second decorative print layer 202 may be completely covered by the shielding layer 300. Therefore, when viewed from the shielding layer 300 and towards the first surface 100a of the base layer 100, the second decorative print layer 202 may not be seen. The shielding layer 300 does not completely cover the first decorative print layer 201, but exposes a part of the upper surface of the first decorative print layer 201. That is, the side surfaces 300S of the shielding layer 300 are disposed on the upper surface of the first decorative print layer 201 and protrude from the side surfaces 202S of the second decorative print layer 202. The width of the shielding layer 300 is smaller than the width of the first decorative print layer 201, and the side surfaces 201S of the first decorative print layer 201 protrude outwardly from the side surfaces 300S of the shielding layer 300. Therefore, when viewed from the second surface 100b and through the base layer 100, the shielding layer 300 is hidden by the first decorative print layer 201 and is not directly seen. That is, when viewed from the second surface 100b and through the base layer 100, the shielding layer 300 is not directly seen and the color represented by the first decorative print pattern 200 can be seen through the base layer 100.

The shielding layer 300 may have excellent durability as compared to the second decorative print layer 202. For example, the shielding layer 300 can be produced by increasing the ratio of a resin to a pigment. As the ratio of the resin increases, strength and adhesion can be improved. If the second decorative print layer 202 having a relatively low durability is exposed to the outside, it can be easily detached by an external impact in some instances. In contrast, according to some embodiments of the present disclosure, the shielding layer 300 completely covers the upper surface and the side surfaces 202S of the second decorative print layer 202 to protect them, such that it is possible to prevent the second decorative print layer 202 from being detached (e.g., due to external impacts). Since the shielding layer 300 has excellent durability, it is not easily detached by an external impact. Therefore, the second decorative print layer 202 can be attached more stably (e.g., than if a shielding layer 300 is not provided).

Figure 4:
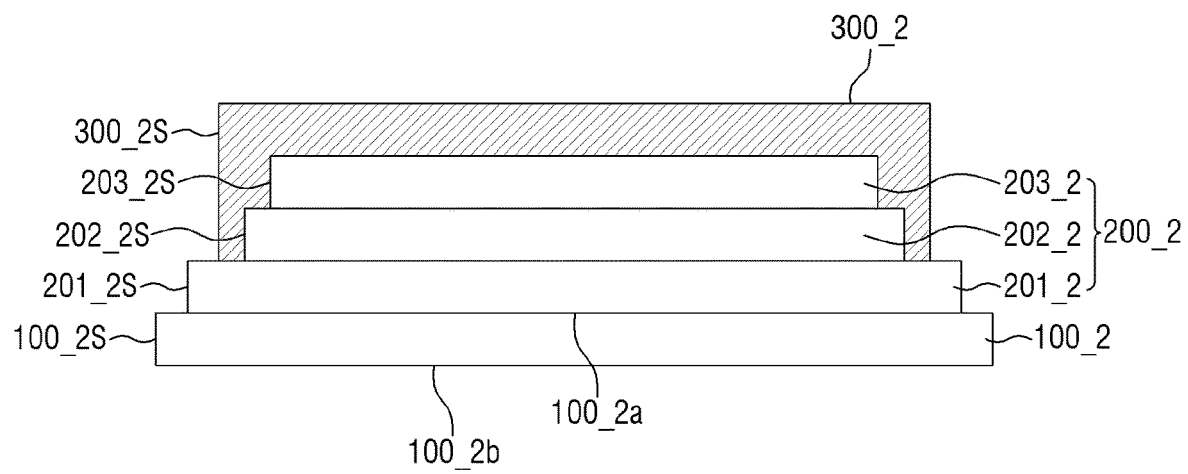
FIG. 4 is a cross-sectional view of a decorative print member according to some embodiments of the present disclosure.

FIG. 4 is a cross-sectional view of a decorative print member according to some embodiments of the present disclosure. FIG. 4 depicts a decorative print member 10_2 having a base layer 100_2 with surfaces 100_2a and 100_2b, and a first decorative print pattern 200_2.

Referring to FIG. 4, the first decorative print pattern 200_2 of the decorative print member 10_2 includes a first decorative print layer 201_2, a second decorative print layer 202_2, and a third decorative print layer 203_2.

The third decorative print layer 203_2 is disposed on the second decorative print layer 202_2. That is, the second decorative print layer 202_2 may be disposed between the first decorative print layer 201_2 and the third decorative print layer 203_2.

Even though the third decorative print layer 203_2 has been added (e.g., relative to the embodiments shown in FIGS. 1-2), the side surface of the first decorative print pattern 200_2 can maintain generally stairs-like shape. Specifically, the side surfaces 203_2S of the third decorative print layer 203_2 may be located more to the inside than the side surfaces 202_2S of the second decorative print layer 202_2. In other words, the side surfaces 202_2S of the second decorative print layer 202_2 are located more to the outside (e.g., protrude outwardly) than the side surfaces 203_2S of the third decorative print layer 203_2, but the side surfaces 202_2S are located more to the inside than the side surfaces 201_2S of the first decorative print layer 201_2 (e.g., the side surfaces 201_2S protrude outwardly from the side surfaces 202_2S).

A shielding layer 300_2 is disposed over the first decorative print pattern 200_2. The shielding layer 300_2 covers the entire upper surface of the third decorative print layer 203_2 and extends outwardly to cover the side surfaces 203_2S of the third decorative print layer 203_2. Further, the shielding layer 300_2 covers the upper surface of the second decorative print layer 202_2 protruding from the side surfaces 203_2S of the third decorative print layer 203_2. The shielding layer 300_2 does not completely cover the first decorative print layer 201_2, but exposes a part of the upper surface of the first decorative print layer 201_2. That is, the side surfaces 300_2S of the shielding layer 300_2 are located on the upper surface of the first decorative print layer 201_2 protruding from the side surfaces 200_2S of the second decorative print layer 200_2. Accordingly, the upper surface and the side surfaces 203_2S of the third decorative print layer 203_2 are completely covered by the shielding layer 300_2, and the upper surface and the side surfaces 202_S of the second decorative print layer 202_2 are completely covered by the third decorative print layer 203_2 and the shielding layer 300_2. As a result, when viewed from the shielding layer 300_2 and towards surface 100_2a of the base layer 100_2, the second decorative print layer 202_2 and the third decorative print layer 203_2 may not be seen. In addition, when viewed from the surface 100_2b and through the base layer 100_2, the second decorative print layer 202_2, the third decorative print layer 203_2 and the shield layer 300_2 may not be directly seen.

Figure 5:
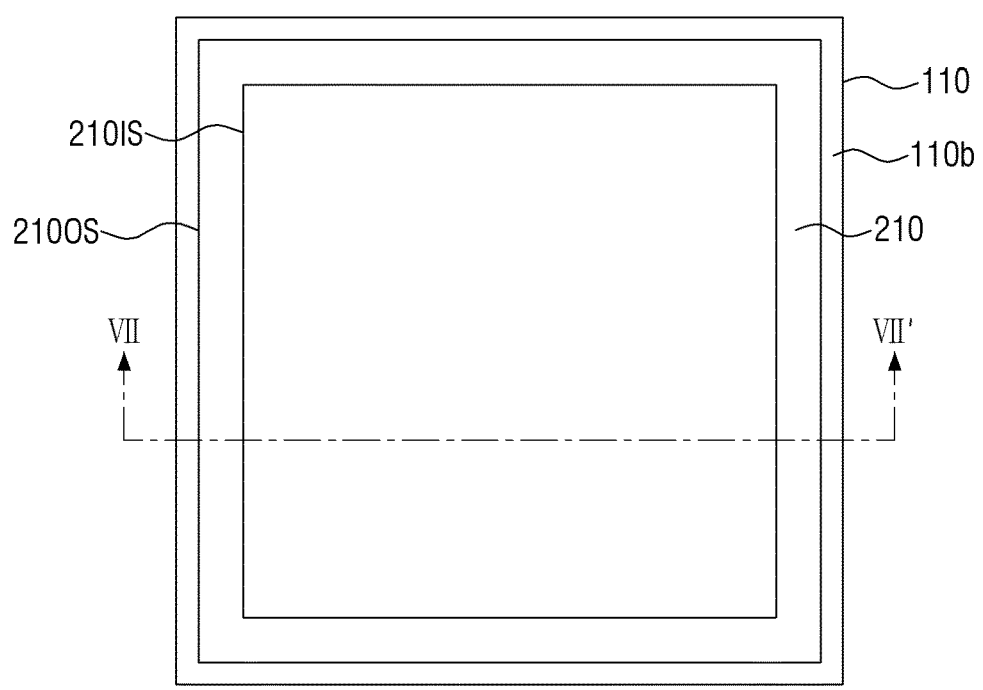
FIG. 5 is a plan view of a decorative print member according to some embodiments of the present disclosure.
Figure 6:
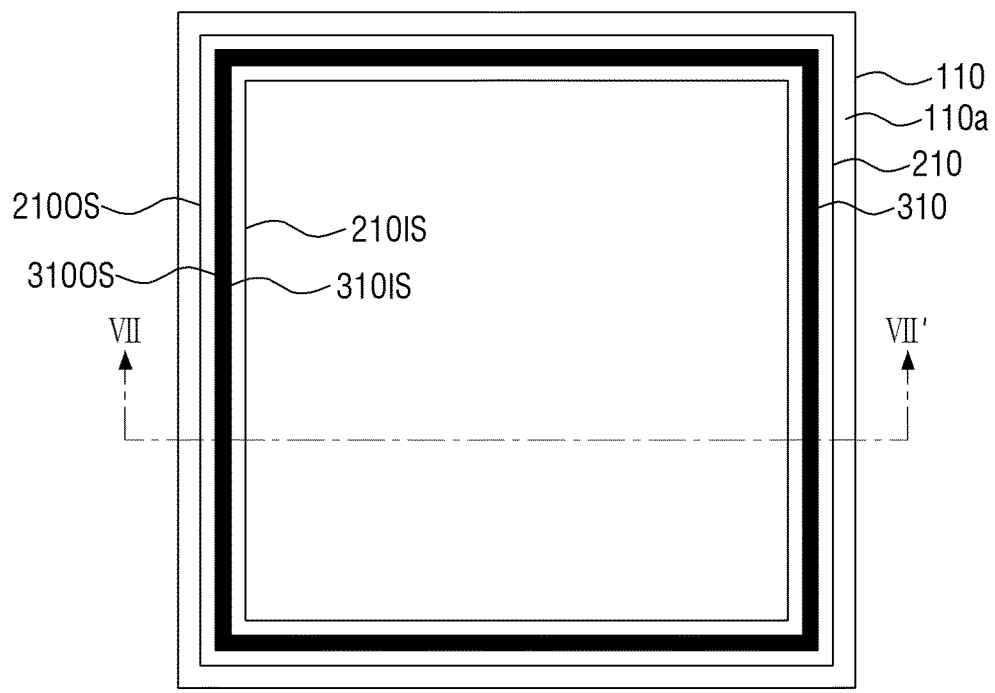
FIG. 6 is a rear view of the decorative print member of FIG. 5.
Figure 7:
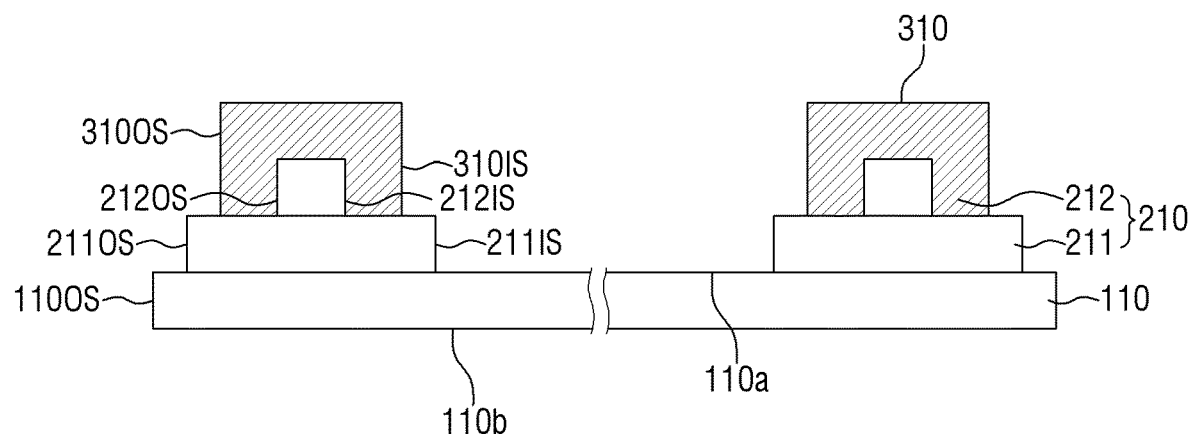
FIG. 7 is a cross-sectional view taken along line VII-VII' of FIGS. 5 and 6.

FIG. 5 is a plan view of a decorative print member according to some embodiments of the present disclosure (e.g., viewed from surface 100b). FIG. 6 is a rear view of the decorative print member of FIG. 5 (e.g., viewed from the shielding layer 310). FIG. 7 is a cross-sectional view taken along line VII-VII' of FIGS. 5 and 6.

In FIGS. 5-7, a first decorative print pattern 210 and a shielding layer 310 of a decorative print member 11 are formed in a line shape.

Referring to FIGS. 5 to 7, the first decorative print pattern 210 and the shielding layer 310 are formed in a line pattern, and may have a rectangular frame shape in which the center portion is empty (e.g., open) in the plan view. Two side surfaces of the first decorative print pattern 210 in the line pattern shape may be divided into an inner edge 210IS closer to the center of the base layer 110 and an outer edge 210OS closer to the side surface of the base layer 110. In FIGS. 5 to 7, the width of the first decorative print pattern 210, that is, the distance between the inner edge 210IS and the outer edge 210OS, is shown as being constant. However, this is merely illustrative, and the first decorative print pattern 210 is not limited thereto or thereby. The width of the first decorative print pattern 210 may vary depending on the position.

In FIGS. 5-7, the inner edge 210IS of the first decorative print pattern 210 is depicted as being symmetrical with the outer edge 210OS of the first decorative print pattern 210. Specifically, the outer edge 210OS and the inner edge 210IS of the first decorative print pattern 210 may be formed generally in a stairs-like shape.

That is, the inner side surface 212IS and the outer side surface 212OS of the second decorative print layer 212 may be disposed on the first decorative print layer 211. In other words, the inner side surface 211IS of the first decorative print layer 211 may be located more to the inside than the inner side surface 212IS of the second decorative print layer 212 (e.g., may protrude further inwards), and the outer side surface 211OS of the first decorative print layer 211 may be located more to the outside than the outer side surface 212OS of the second decorative print layer 212 (e.g., may protrude further outwards). Therefore, the width of the first decorative print layer 211, that is, the distance between the inner side surface 211IS and the outer side surface 211OS, may be larger than the width of the second decorative print layer 212. As a result, the first decorative print layer 211 may include a first portion overlapping with the second decorative print layer 212 as well as a second portion not overlapping with the second decorative print layer 212 (hereinafter referred to as non-overlapping portion).

The shielding layer 310 may cover the upper surface and both side surfaces 212IS and 212OS of the second decorative print layer 212. That is, the inner side surface 310IS of the shielding layer 310 may be located more to the inside than the inner side surface 212IS of the second decorative print layer 212 (e.g., may protrude further inwards), while the outer side surface 310OS may be located more to the outside than the outer side surface of the second decorative print layer 212 (e.g., may protrude further outwards). Therefore, the second decorative print layer 212 may not be seen from the second surface 110b of the base layer 110.

The shielding layer 310 exposes a part of the outer upper surface and a part of the inner upper surface of the first decorative print layer 211. That is, the inner side surface 310IS of the shielding layer 310 may be located on the upper surface of the first decorative print layer 211 protruding from the inner side surface 212IS of the second decorative print layer 212, while the outer side surface 310OS of the shielding layer 310 may be located on the upper surface of the first decorative print layer 211 protruding from the outer side surface 212OS of the second decorative print layer 212. Accordingly, the distance between the inner side surface 310IS and the outer side surface 310OS of the shielding layer 310 is smaller than the width of the first decorative print layer 211, and larger than the width of the second decorative print layer 212.

As a result, when viewed from the second surface 110b and through the base layer 110, the shielding layer 310 is hidden by the first decorated print layer 211 and is not directly seen.

It is to be noted that in some embodiments, the inner edge 210IS and the outer edge 210OS of the first decorative print pattern 210 may have different shapes. Specifically, the inner edge 210IS of the first decorative print pattern 210 may be less sensitive to an external impact than the outer edge 210OS. Accordingly, while the outer edge 210OS of the first decorative print pattern 210, which is vulnerable to an external impact, is protected by the shielding layer 310 that covers the first decorative print pattern 210 and the upper surface and the outer side surface 212OS of the second decorative print layer 212 in the stairs-like shape as described above with respect to the exemplary embodiment shown in FIGS. 1 and 2, the inner edge 210IS of the first decorative print pattern 210 can have more design freedom without being limited thereby. More detailed descriptions thereof will be given with reference to FIG. 8.

Figure 8:
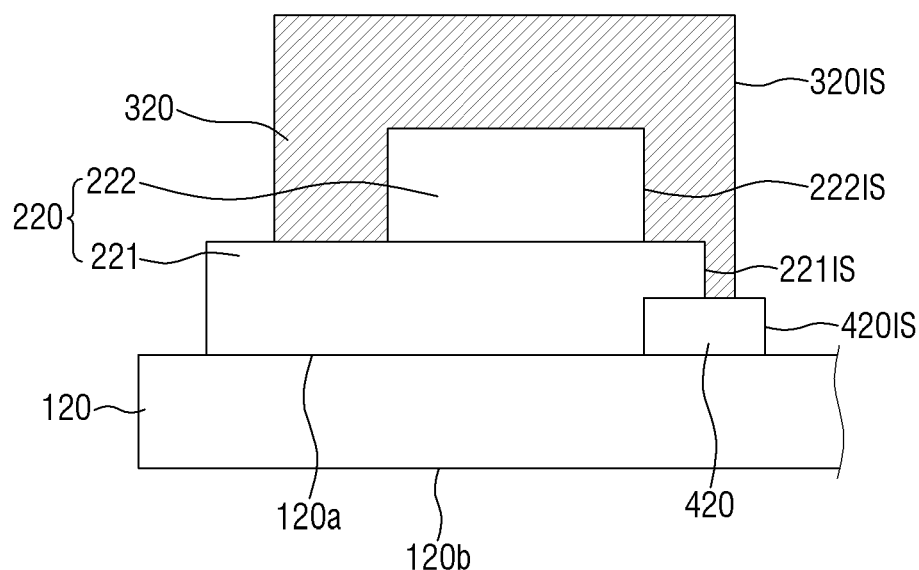
FIG. 8 is a cross-sectional view of a decorative print member according to some embodiments of the present disclosure.

FIG. 8 is a cross-sectional view of a decorative print member according to some embodiments of the present disclosure.

The decorative print member 12 according to some embodiments of the present disclosure is different from that of FIGS. 5 to 7 in that the embodiments shown in FIG. 8 further include a second decorative print pattern 420 formed at an inner edge of a first decorative print pattern 220. The structure of the outer edge of the decorative print member 12 is identical or similar to that of the embodiments shown in FIGS. 5 to 7, and, therefore, the description thereof will not be provided again. The description of FIG. 8 will focus on the structure of the inner edge.

Referring to FIG. 8, a first decorative print layer 221 and a second decorative print pattern 420 are disposed on a base layer 120.

The second decorative print pattern 420 is disposed adjacent to the inner side surface 221IS of the first decorative print layer 221. By disposing the second decorative print pattern 420 adjacent to the inner side surface 221IS of the first decorative print layer 221, it is possible to prevent ink overflow during the process of printing the first decorative print layer 221. That is, the second decorative print pattern 420 may work as a bank (e.g., buffer) layer for defining the inner region.

The thickness of the second decorative print pattern 420 may be smaller than the thickness of the first decorative print layer 221. The first decorative print layer 221 may come in contact with the outer side surface 420OS of the second decorative print pattern 420 and may flow over to the second decorative print layer 420 (e.g., during formation) such that the first decorative print layer 221 may extend up to the upper surface of the second decorative print pattern 420. It is to be noted that the first decorative print layer 211 preferably covers only a part of the upper surface of the second decorative print pattern 420 while exposing an inner part thereof.

The second decorative print layer 222 may be disposed on the upper surface of the first decorative print layer 221. That is, both the inner side surface 222IS and the outer side surface 222OS of the second decorative print layer 222 may be located on the upper surface of the first decorative print layer 221 (e.g., the second decorative print layer 222 may have a narrower width than the first decorative print layer 221). Therefore, the second decorative print layer 222 is not in contact with the second decorative print pattern 420.

A shielding layer 320 is disposed on the upper surface of the second decorative print layer 222. That is, the shielding layer 320 extends inwardly from the upper surface of the second decorative print layer 222 such that the shielding layer 320 may cover the inner side surface 222IS of the second decorative print layer 222 and the inner side surface 222IS of the first decorative print layer 221.

At the inner edge, the shielding layer 320 covers the upper surface and the inner side surface 222IS of the second decorative print layer 222 as well as the protruding upper and inner side surfaces 221IS of the first decorative print layer 221, and a part of the upper surface of the second decorative print pattern 420. That is, the inner side surface 320IS of the shielding layer 320 protrudes from the inner side surface 222IS of the second decorative print layer 222 and the inner side surface 221IS of the first decorative print layer 221. A part of the upper surface of the second decorative print pattern 420 on the inner side is not covered by the shielding layer 320 and is exposed.

As a result, when the inner edge of the decorative print member 12 is viewed from the shielding layer 120 and towards a first surface 120a of the base layer 120, only the shielding layer 320 and the upper surface of the second decorative print pattern 420 protruding from the inner side surface 320IS of the shielding layer 320 are seen, but the inner upper surface of the first decorative print layer 221 and the upper surface of the second decorative print layer 222 are not seen. When the decorative print member 12 is viewed from a second surface 120b and through the base layer 120, the first decorative print layer 221 and the second decorative print pattern 420 are directly seen, but the second decorative print layer 222 and the shielding layer 320 are not directly seen. The first decorative print layer 221 and the second decorative print pattern 420 may be formed in different colors from each other. In this case, the first decorative print layer and the second decorative print pattern 420 are more clearly distinguished from each other.

Figure 9:
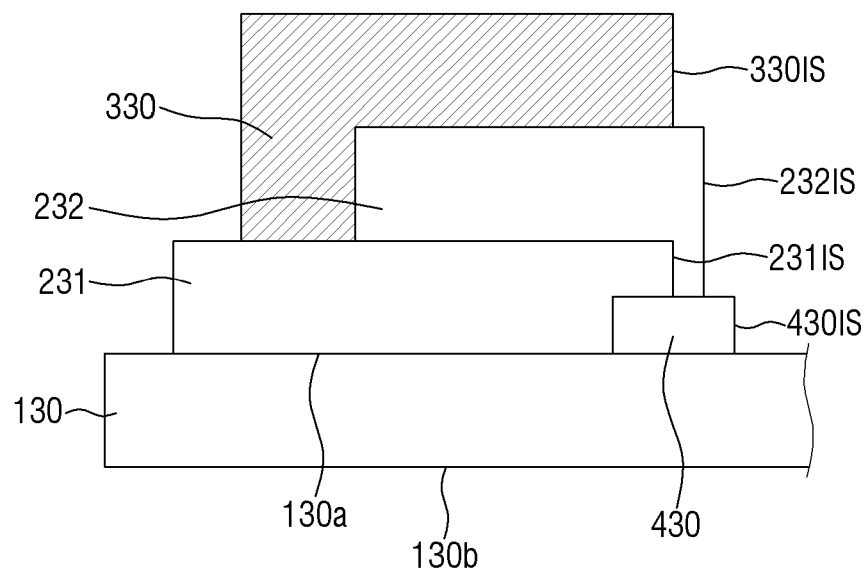
FIG. 9 is a cross-sectional view of a decorative print member according to some embodiments of the present disclosure.

FIG. 9 is a cross-sectional view of a decorative print member according to some embodiments of the present disclosure.

Referring to FIG. 9, the decorative print member 13 according to some embodiments of the present disclosure is different from that of the embodiments shown in FIG. 8 in that a second decorative print pattern 232 covers the upper surface and the inner side surface 231IS of the first decorative print layer 231 at the inner edge. The structures of the outer edge, the first decorative print layer 231 and the second decorative print pattern 430 are identical or similar to those of the embodiments shown in FIG. 8, and, therefore, the description thereof will not be provided again. The description of FIG. 9 will focus on the structure of the second decorative print layer 232 at the inner edge.

The inner side surface 232IS of the second decorative print layer 232 is located more to the inside than the inner side surface 231IS of the first decorative print layer 231 (e.g., protrudes inwardly). Therefore, the second decorative print layer 232 may include a first portion overlapping with the first decorative print layer 231 as well as a second portion not overlapping with the first decorative print layer 231.

The inner side surface 232IS of the second decorative print layer 232, located more to the inside than the inner side surface 231IS of the first decorative print layer 231 (e.g., protruding inwardly), may be located on the upper surface of the second decorative print pattern 430.

The second decorative print layer 232 covers the inner upper surface and the inner side surface 231IS of the first decorative printed layer 231, such that the inner side surface 330IS of the shielding layer 330 may be disposed at a desired position. For example, the inner side surface 300IS of the shielding layer 330 may be located more to the inside than the inner side surface 232IS of the second decorative print layer 232 (e.g., the second decorative print layer 232 extends further inwardly) or may be substantially aligned with the inner side surface 23215 of the second decorative print layer 232 (e.g., the inner side surfaces 300IS and 232IS are coplanar). FIG. 9 illustrates that the inner surface 330IS of the shielding layer 330 is located on the upper surface of the second decorative print layer 232.

As a result, when the inner edge of the decorative print member 13 is viewed from the shielding layer 330 and towards a first surface 130a of the base layer 130, the shielding layer 330, the inner upper surface of the second decorative print layer protruding from the inner side surface 330IS of the shielding layer 330, and the inner upper surface of the decorative print layer 232 protruding from the inner side surface 232IS of the second decorative print layer 232 can be seen. Also in this case, the upper surface and the inner surface 231IS of the first decorative print layer 231 may not be seen at the inner edge as in the exemplary embodiment shown in FIG. 8.

The above-described decorative print member can be applied to a display device. For example, the decorative print member can be applied to a window of a display device to prevent a non-display area of the display device from being seen, and also provide aesthetic effects. Hereinafter, embodiments where a decorative print member is employed in a smart phone including an organic light-emitting display device will be described. It is to be understood that exemplary embodiments of the present disclosure are not limited thereto.

Figure 10:
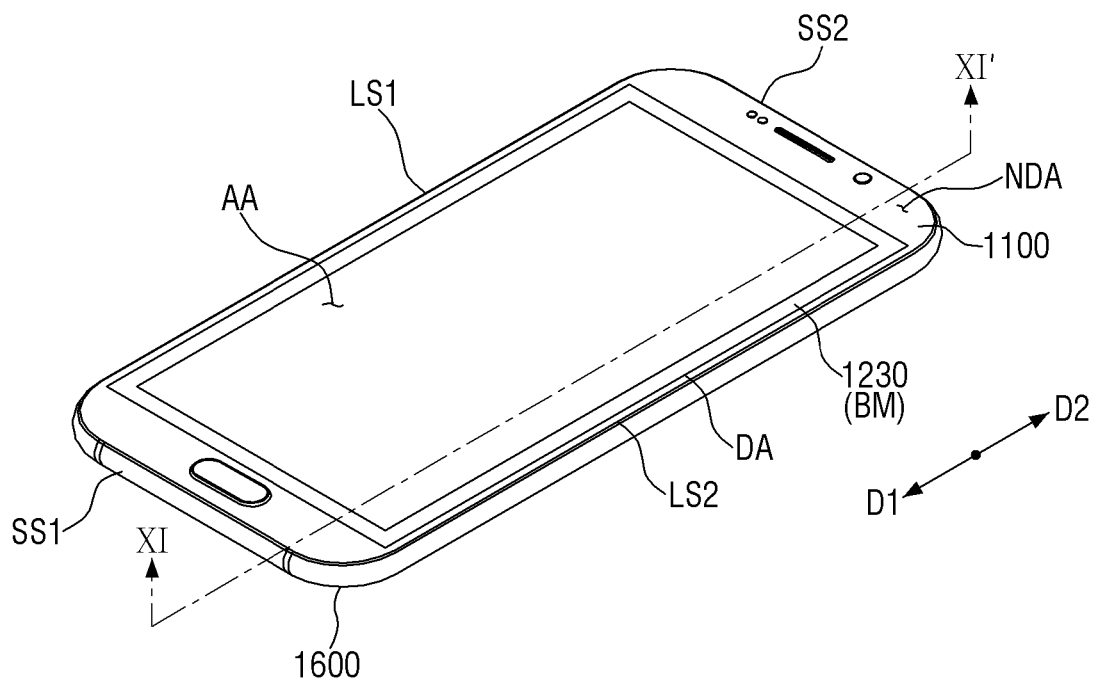
FIG. 10 is a perspective view of a display device according to some embodiments of the present disclosure.
Figure 11:
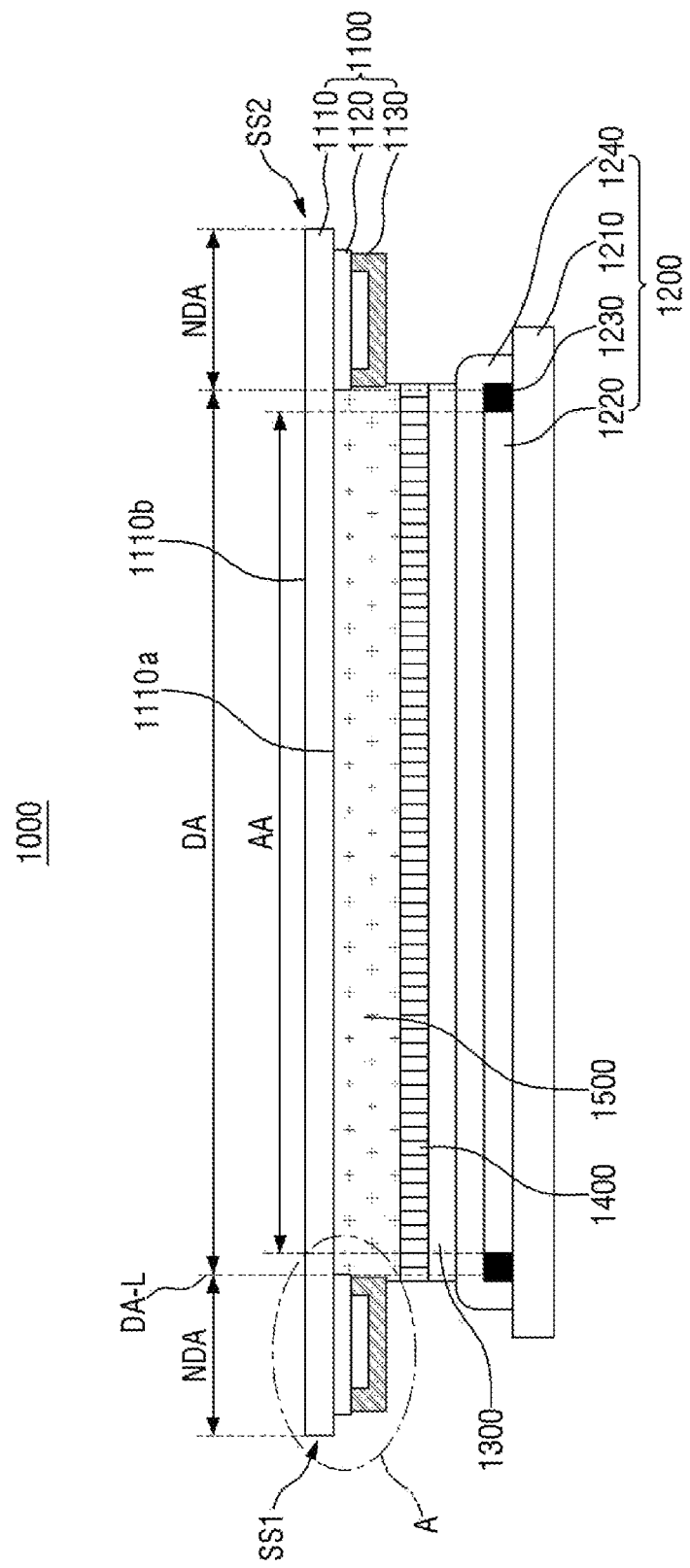
FIG. 11 is a cross-sectional view taken along line XI-XI' of FIG. 10.

FIG. 10 is a perspective view of a display device according to some embodiments of the present disclosure. FIG. 11 is a cross-sectional view taken along line XI-XI' of FIG. 10.

Referring to FIGS. 10 and 11, the display device 1000 includes a window 1100, a display panel 1200 opposite to the window 1100, a touch element 1300 disposed between the window 1100 and the display panel 1200, a polarization element 1400, an adhesive element 1500, and a lower case 1600 disposed under the display panel 1200 and coupled with the window 1100. The decorative print members 10, 11, 12 and 13 described above may be employed in the window 1100. The window 1100 will be described later in more detail.

The display device 1000 may have a rectangular shape including a first longer side LS1 and a second longer side LS2 opposing each other and a first shorter side SS1 and a second shorter side SS2 opposite to each other in-plane. However, this is merely illustrative, and the display device is not limited thereto or thereby. The display device 1000 may have various shapes such as a circular shape or a rectangular shape having rounded corners. The display device 1000 may be partitioned into a display area (DA), a non-display area (NDA), and an active area (AA) in-plane. The display area DA is where images are displayed. The non-display NDA is where no image is displayed. The active area AA is where images are actually displayed. The non-display area NDA is disposed around the display area DA. For example, if the display area DA is a rectangular shape, the non-display area NDA may be disposed along the four sides of the display area DA. The active area AA is disposed so that it completely overlaps with the display area DA. Specifically, the active area AA may be the remaining area of the display area DA excluding the area where no image is displayed by a black matrix 1230 disposed along the boundary DA-L between the display area DA and the non-display area NDA.

The window 1100 includes a transparent substrate 1110, a first decorative print pattern 1120 disposed on the transparent substrate 1110, and a shielding layer 1130 disposed on the first decorative print pattern 1120. Each of the base layers 100, 110, 120 and 130 of the decorative print members 10, 11, 12 and 13 shown in FIGS. 1 to 9 may correspond to the transparent substrate 1110. The first decorative print patterns 200, 210, 220 and 230 may correspond to the first decorative print pattern 1120. The shielding layers 300, 310, 320 and 330 may correspond to the shielding layer 1130.

The transparent substrate 1110 protects the display panel 1200 from an external impact. The transparent substrate 1110 may be made of a transparent material such as glass and resin. The transparent substrate 1100 may have, but is not limited to, a rectangular parallelepiped shape. The transparent substrate 1100 may be formed in various shapes depending on the shape of the display device 1000.

The transparent substrate 1110 includes a first surface 1110a facing the display panel 1120 and a second surface 1110b opposite to the first surface 1110a, which can be seen by a user outside of the display device 1000.

The first decorative print pattern 1120 may be disposed on the first surface 1110a of the transparent substrate 1110. The first decorative print pattern 1120 absorbs or reflects light incident from the second surface 1110b of the transparent substrate 1110 of the display device 1000, and imparts color to the bezel of the display device 1000. The first decorative print pattern 1120 may include an opaque material. For example, the first decorative print pattern 1120 may include a material having the color of midnight black, orchid gray, arctic silver, coral blue, etc. The color of the first decorative print pattern 1120 disposed in the non-display area NDA can be recognized by the user as the frame color at the periphery of the screen, and can give the user aesthetic effects. The cross sectional shape of the first decorative print pattern 1120 will be described later in more detail.

The shielding layer 1130 is disposed on the first decorative print pattern 1120. The shielding layer 1130 absorbs light generated from the first surface 1110a of the transparent substrate 1110 in advance and prevents the incident light from exiting out of the display device 1000 via the first decorative print pattern 1120 and the transparent substrate 1110. The shielding layer 1130 may be made of a resin including various colored pigments such as black and gray. The light-shielding effect can be improved by using a low-brightness color.

The first decorative print pattern 1120 and the shielding layer 1130 are disposed in at least a part of the non-display area NDA of the transparent substrate 1110. The first decorative print pattern 1120 and the shielding layer 1130 are not disposed in the display area DA. A hole for a button or a camera disposed in the non-display area NDA may be additionally formed in the first decorative print pattern 1120 and the shielding layer 1130. The first decorative print pattern 1120 and the shielding layer 1130 may be disposed along or in the non-display area NDA. The first decorative print pattern 1120 and the shielding layer 1130 may be disposed in a continuous closed curve shape along the four sides LS1, LS2, SS1 and SS2 of the transparent substrate 1100. However, this is merely illustrative, and the first decorative print pattern 1120 and the shielding layer 1130 are not limited thereto or thereby. In some implementations, the first decorative print pattern 1120 and the shielding layer 1130 may not be formed along some sides of the transparent substrate 1110. For example, the first decorative print pattern 1120 and the shielding layer 1130 may be formed in a strip shape along the first shorter side SS1 and the second shorter side SS2 of the transparent substrate 1110, but not along the first longer side LS1 and the second longer side LS2. The first decorative print pattern 1120 and the shielding layer 1130 will be described in more detail referring to FIG. 12.

Figure 12:
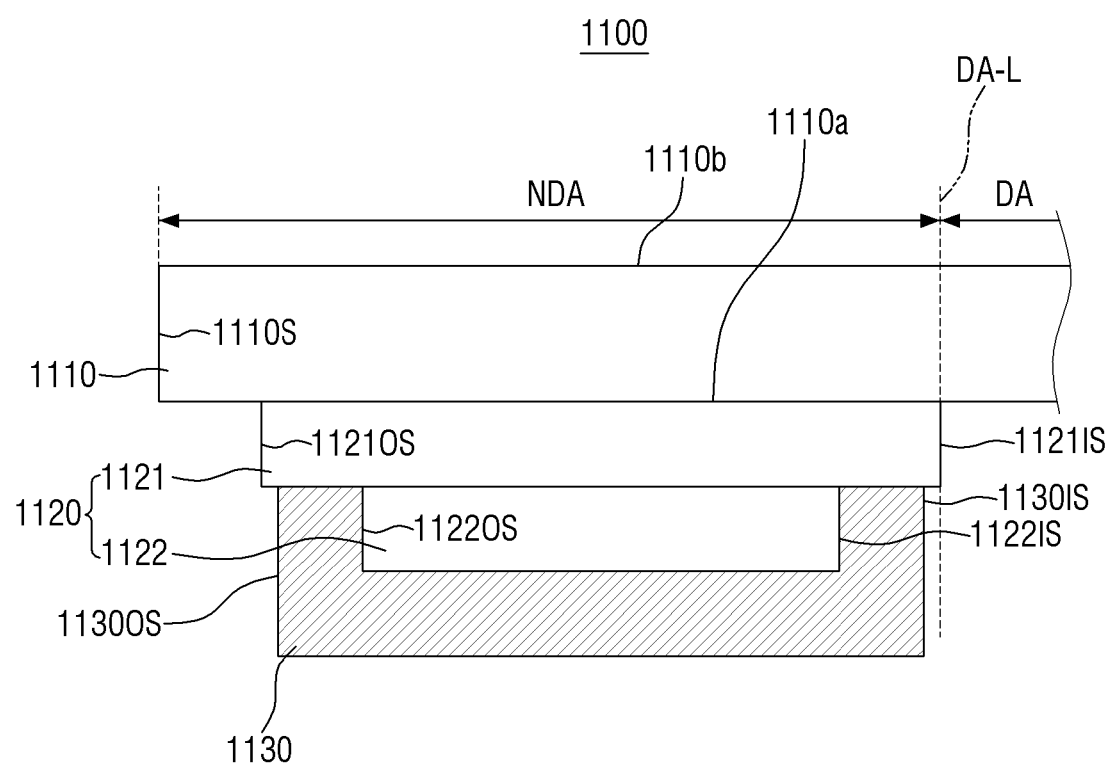
FIG. 12 is an enlarged cross-sectional view of window portion A of FIG. 11.

FIG. 12 is an enlarged cross-sectional view of window region A of FIG. 11. FIG. 12 shows the window 1100 region at the first shorter side SS1 of the display device 1000.

Referring to FIG. 12, the first decorative print pattern 1120 may be implemented as a decorative print pattern stack having a plurality of decorative layers stacked on one another. The first decorative print pattern 1120 may include a first decorative print layer 1121 and a second decorative print layer 1122.

The first decorative print layer 1121 is disposed on the first surface 1110a of the transparent substrate 1110. The first decorative print layer 1121 may extend outwardly from the boundary DA-L between the display area DA and the non-display area NDA. The inner side surface 1121IS of the first decorative print layer 1121 may be substantially aligned with (e.g., coplanar with) the boundary DA-L between the display area DA and the non-display area NDA.

The outer side surface 1121OS of the first decorative print layer 1121 may be located more to the inside than the side surface 1110S of the transparent substrate 1110 (e.g., protruding inwardly). This is, however, merely illustrative, and the first decorative print layer 1121 is not limited thereto or thereby. At least one of the side surfaces of the first decorative print layer 1121 may be aligned with (e.g., coplanar with) the side surface 1110S of the transparent substrate 1110.

When the side surface 1110S of the transparent substrate 1110 protrudes outwardly from the outer side surface 1121OS of the first decorative print layer 1121, the non-display area NDA of the transparent substrate 1110 includes a portion overlapping with the first decorative print layer 1121 and a non-overlapping portion. A part of the transparent substrate 1110 protruding outwardly from the outer side surface 1121OS of the first decorative print layer 1121 (i.e., a part of the surface of the transparent substrate 1110 that does not overlap with the first decorative print layer 1121) may be exposed. An adhesive element may be disposed on the exposed part of the transparent substrate 1110 when the window 1100 is coupled with the lower case 1600. Alternatively, an additional decorative print pattern may be formed on the exposed part of the transparent substrate 1110, in addition to the first decorative print pattern 1120.

The second decorative print layer 1122 may be disposed on the upper surface of the first decorative print layer 1121. The second decorative print layer 1122 may generally overlap with the first decorative print layer 1121 and may have a shape conforming to the shape of the first decorative print layer 1121. It is to be noted that the side surfaces 1122IS and 1122OS of the second decorative print layer 1122 may be located more to the inside than the respective side surfaces 1121IS and 1121OS of the first decorative print layer 1121 (e.g., the first decorative print layer 1121 may protrude further inwards than the second decorative print layer 1122). That is, the side surfaces 1122IS and 1122OS of the second decorative print layer 1122 may be located on the upper surface of the first decorative print layer 1121. In other words, the side surfaces 1121IS and 1121OS of the first decorative print layer 1121 may be located more to the outside than the respective side surfaces 1122IS and 1122OS of the second decorative print layer 1122, respectively (e.g., the first decorative print layer 1121 may protrude further inwards and outwards than the second decorative print layer 1122).

Accordingly, the width of the first decorative print layer 1121 is larger than the width of the second decorative print layer 1122, and the side surfaces of the first decorative print pattern 1120 may be formed generally in a stairs-like shape and may be symmetrical vertically.

The side surface 1122OS of the second decorative print layer 1122 may be spaced apart from the side surface 1110S of the base layer 1110 more than the side surface 1121OS of the first decorative print layer 1121 is spaced apart from the side surface 1110S of the transparent substrate 1110. For example, the side surface 1122OS of the second decorative print layer 1122 may be spaced apart from the side surface 1110S of the transparent substrate 1110 by approximately 0.5 mm, while the side surface 1121OS of the first decorative print layer 1121 may be spaced apart from the side surface 1110S of the transparent substrate 1110 by approximately 0.1 mm.

Both side surfaces of the first decorative print pattern 1120 have a stairs-like shape as described above. Therefore, when the display device 1000 is viewed from the second surface 1110b and through the transparent substrate 1110, the second decorative print layer 1122 is not directly seen but is indirectly seen through the first decorative print layer 1121.

The shielding layer 1130 is disposed on the first decorative print pattern 1120. The shielding layer 1130 may have a shape conforming to the shape of the first decorative print pattern 1120. The shielding layer 1130 covers the entire upper surface of the second decorative print layer 1122 and extends outwardly and inwardly to cover both side surfaces 1122IS and 1122OS of the second decorative print layer 1122, respectively. On the other hand, the shielding layer 1130 does not completely cover the first decorative print layer 1121 but exposes a part of the upper surface of the first decorative print layer 1121. That is, the outer side surface 1130OS of the shielding layer 1130 is disposed on the upper surface of the first decorative print layer 1121 protruding from the outer side surface 1122OS of the second decorative print layer 1122. Like the outer side surface 1130OS, the inner side surface 1130IS of the shielding layer 1130 may be located on the upper surface of the first decorative print layer 1121. In other words, the inner side surface 1130IS of the shielding layer 1130 is located closer to the boundary DA-L between the display area DA and the non-display area NDA than the inner side surface 1122IS of the second decorative print layer 1130, and spaced apart from it more than the inner side surface 1121IS of the first decorative print layer 1121. When the window 1100 is viewed from shielding layer 1130 and towards the first surface 1110a of the transparent substrate 1110, the second decorative print layer 1122 is completely covered by the shielding layer 1130 and is not seen. In addition, when the display device 1000 is viewed from the second surface 1110b and through the transparent substrate 1110, the shielding layer 1130 is hidden by the first decorative print layer 1121 and is not directly seen. That is, the shielding layer 1130 is not directly seen from outside the display device 1000, and the color represented by the first decorative print pattern 1120 can be seen.

The shielding layer 1130 may have excellent durability (e.g., adhesion, strength) as compared to the second decorative print layer 1122. The second decorative print layer 1122 having a relatively low durability may be easily detached by an external impact. In contrast, according to some embodiments of the present disclosure, the shielding layer 1130 having excellent durability completely covers the upper surface and both side surfaces 1122IS and 1122OS of the second decorative print layer 1122 to protect them, such that it is possible to prevent the second decorative print layer 1122 from being detached. That is, the shielding layer 1130 has excellent durability and thus it not easily detached, such that the second decorative print layer 1122 can be attached more reliably.

Referring back to FIGS. 10 and 11, the display panel 1200 is located opposite to the window 1100 and overlaps with it.

The display panel 1200 displays images thereon. For example, the display panel 1200 may be an organic light-emitting display panel (OLED panel), a liquid-crystal display panel (LCD panel), or the like. In this embodiment, an organic light-emitting display panel is employed as the display panel 1200.

The display panel 1200 may include a base substrate 1210, a display unit 1220 disposed on the base substrate 1210, a black matrix 1230 disposed on the base substrate 1210 and formed along the periphery of the display unit 1220, and an encapsulation layer 1240 covering and protecting the display unit 1220.

The base substrate 1210 supports the display unit 1220. The base substrate 1210 may be an insulating substrate. In some embodiments, the base substrate 1210 may include materials such as glass, quartz, and a polymeric resin. The polymer material may be polyacrylate (PA), polyacrylate (PAR), polyetherimide (PEI), polyethylenenapthalate (PEN), polyethyleneterephthalate (PET), polyphenylenesulfide (PPS), polyallylate, polyimide (PI), polycarbonate (PC), cellulose acetate propionate (CAP), or combinations thereof. In another exemplary embodiment, the base substrate 1210 may be a flexible substrate including polyimide (PI).

The base substrate 1210 may have a shape conforming to the shape of the display device 1000. In some embodiments, the base substrate 1210 may be in the form of a hexahedron, but the shape of the base substrate 1210 is not limited thereto or thereby. In some embodiments, the base substrate 1210 may have various shapes depending on the shape of the display device 1000.

The base substrate 1210 may be completely covered by the transparent substrate 1110. In other words, the transparent substrate 1110 includes a portion overlapping with the base substrate 1210 and a non-overlapping portion.

The base substrate 1210 completely overlaps with the display area DA of the window 1100. The base substrate 1210 may include a portion protruding outwardly from the boundary DA-L between the display area DA and the non-display area NDA. For example, referring to FIG. 12, the first shorter side SS1 of the base substrate 1210 may protrude outwardly from the boundary DA-L between the display area DA and the non-display area NDA.

The display unit 1220 and the black matrix 1230 may be disposed on the base substrate 1210.

The display unit 1220 is formed in the active area. The display unit 1220 includes a pixel electrode, a pixel defining layer formed on the pixel electrode to define each pixel, and an organic light-emitting element disposed in each pixel to emit light. A number of features may be further disposed between the base substrate 1210 and the pixel electrode. For example, the features may include a buffer layer, a plurality of conductive wirings, an insulating layer, a plurality of thin-film transistors, etc.

The black matrix 1230 may be disposed around the display unit 1220. For example, if the display unit 1220 has a rectangular shape, the black matrix 1230 may be formed along the four sides of the display unit 1220.

The black matrix 1230 is formed outside the active area AA and cannot be formed in the active area AA. The black matrix 1230 may overlap with the display area DA and the non-display area NDA of the window 1100. That is, the black matrix may overlap with the boundary DA-L between the display area DA and the non-display area NDA. In addition, the black matrix 1230 may overlap with the first decorative print pattern 1120.

The encapsulation layer 1240 may be disposed on the base substrate 1210 so as to cover the display unit 1220. That is, the display unit 1220 may be disposed between the base substrate 1210 and the encapsulation layer 1240. The encapsulation layer 1240 covers the display unit 1220 and the like so that they are isolated from the outside to protect them.

The encapsulation layer 1240 may be made up of a single layer of an organic layer or an inorganic layer or may be made up of multiple layers formed by stacking them. For example, the encapsulation layer 1240 may be formed by stacking a first inorganic layer, an organic layer on the first inorganic layer, and a second inorganic layer on the organic layer.

In some embodiments, the encapsulation layer 1240 may be a transparent insulating substrate. In this case, a sealing member may be formed between the encapsulation layer 1240 and the base substrate 1210 for attaching the encapsulation layer 1240 and the base substrate 1210 together.

A touch member 1300 may be formed on the encapsulation layer 1240.

The touch member 1300 includes a touch substrate such as a PET film, wirings, a touch sensor, and the like.

The touch member 1300 can sense a touch if an object approaches the touch member 1300 or touches the touch member 1300. As used herein, a touch includes not only a direct physical contact by an object such as a user's finger on the touch member 1300 but also includes an object getting in proximity or hovering of the object, i.e., moving in proximity to the touch member 1300.

The polarizing element 1400 may be formed on the touch element 1300.

The outer ends of the polarizing element 1400 may be located on the non-display area NDA. That is, the outer ends of the polarizing element 1400 may be located on the outer side of the boundary DA-L between the display area DA and the non-display area NDA.

The polarization element 1400 can reduce the reflection of external light to thereby increase the contrast ratio. The polarizing element 1400 converts the optical axis of light exiting via the display unit 1220.

In some embodiments, the polarizing element 1400 may include a polyvinyl alcohol-based film in which iodine or a dichroic dye is stained and oriented.

It is to be noted that the polarizing element 1400 may be eliminated or may be disposed at a different position as desired.

The adhesive element is disposed on the polarizing element 1400. The adhesive element 1500 is interposed between the window 1100 and the display panel 1200 to couple the window 1100 with the display panel 1200. The adhesive element 1500 may be formed of an optically clear resin (OCR) or an optically clear adhesive (OCA).

The outer ends of the adhesive element 1500 may be aligned with the respective outer ends of the polarizing element 1400. The outer ends of the adhesive element 1500 may be located on the non-display area NDA. That is, the outer ends of the adhesive element 1500 may be located between the inner side surface 1130IS and the outer side surface 1130OS of the shielding layer 1130.

The adhesive element 1500 may be in contact with a part of the upper surface and the inner side surface 1130IS of the shielding layer 1130. The adhesive element 1500 may be in contact with the exposed portion of the upper surface of the first decorative print layer 1121 that is not covered by the shielding layer 1130 and with the inner side surface 1121IS. That is, the upper surface of the first decorative print layer 1121 protruding from the inner side surface 1130IS of the shielding layer 1130 may be in contact with the adhesive element 1500.

At least a portion of the upper surface of the shielding layer 1130 in which the adhesive element 1500 is not disposed may coupled with the lower case 1600.

Figure 13:
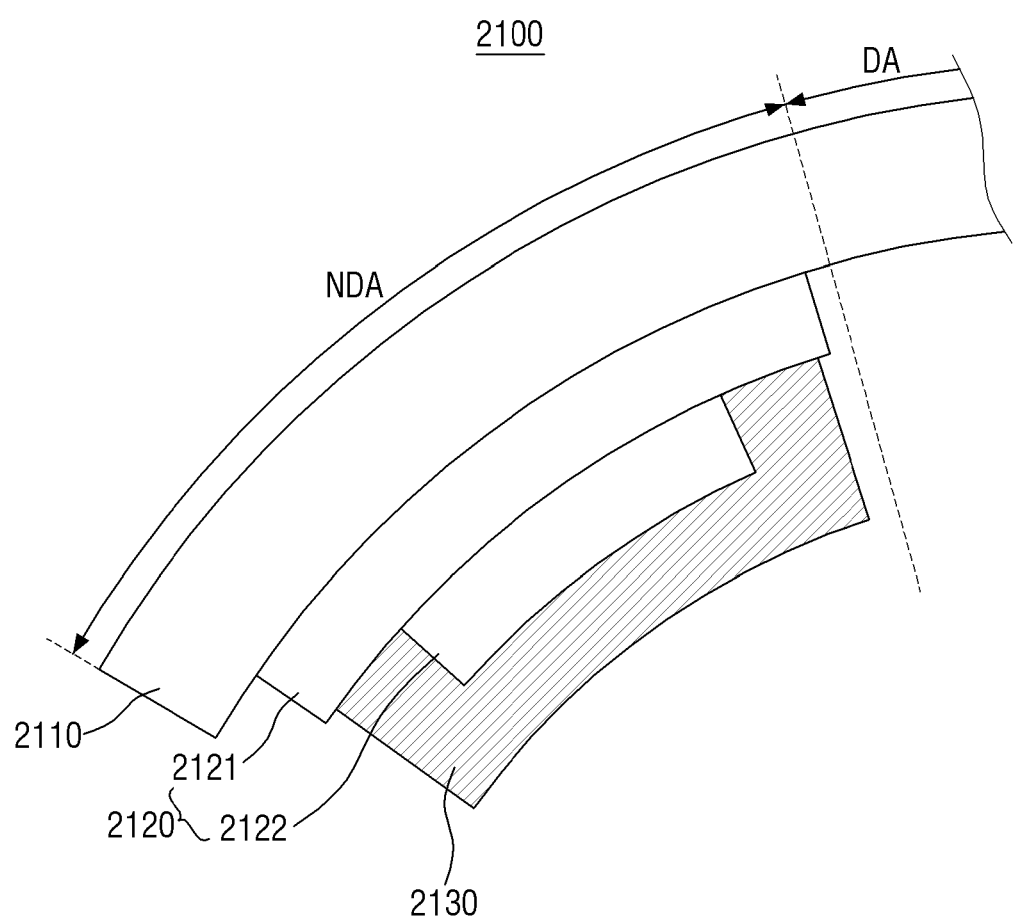
FIG. 13 is a cross-sectional view of a part of the window region A of FIG. 11 according to some embodiments of the present disclosure.

FIG. 13 is a cross-sectional view of a part of the window region A according to some embodiments of the present disclosure.

The display device 1000 may be a flexible display device. The window 2100 of the flexible display device may include a bent area with a curved surface.

Referring to FIG. 13, the entire non-display area NDA of the transparent substrate 2110 and a part of the display area DA may be bent at a predetermined curvature.

A first decorative print pattern 2120 and a shielding layer 2130 may be formed on the transparent substrate 2110. Also in the flexible display device 2000, the first decorative print pattern 2120 having a stairs-like shape and the shielding layer 2130 covering the first decorative print pattern 2120 may be formed as described above. In addition, the first decorative print pattern 2120 and the shielding layer 2130 may be bent at the same curvature as the curvature of the transparent substrate 2110.

Figure 14:
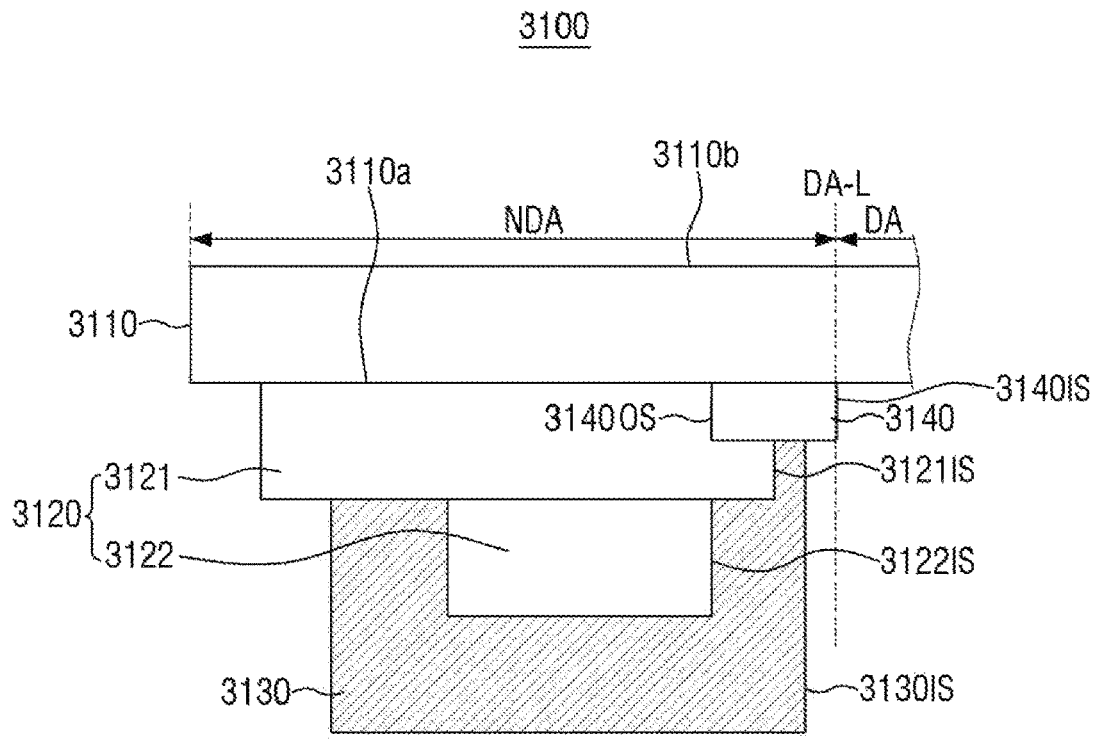
FIG. 14 is a cross-sectional view of a part of the window region A of FIG. 11 according to some embodiments of the present disclosure.

FIG. 14 is a cross-sectional view of a part of the window region A according to some embodiments of the present disclosure.

The display device shown in FIG. 14 employs the decorative print member 12 shown in FIG. 8.

The window 3100 according to some embodiments is different from that of the embodiments shown in FIG. 12 in that the window 3100 further includes a second decorative print pattern 3140 formed at the boundary DA-L between the display area DA and the non-display area NDA. In this embodiment, the structures of the first decorative print pattern 3120 and the shielding layer 3130 on the outer side of the window 3100 are identical or similar to those of the embodiment of FIG. 12; and, therefore, the description thereof will not be provided again. The description of FIG. 14 will focus on the structure at the boundary DA-L between the display area DA and the non-display area NDA.

Referring to FIG. 14, a first decorative print layer 3121 and a second decorative print pattern 3140 are disposed on a first surface 3110a of a transparent substrate 3110.

The second decorative print pattern 3140 may extend outwardly from the boundary DA-L between the display area DA and the non-display area NDA. The width of the second decorative print pattern 3140 (i.e., the distance between the outer side surface 3140OS and the inner side surface 3140IS of the second decorative print pattern 3140) is smaller than the width of the first decorative print layer 3121. The second decorative print pattern 3140 is disposed adjacent to the inner side surface 3121IS of the first decorative print layer 3121. By disposing the second decorative print pattern 3140 adjacent to the inner side surface 3121IS of the first decorative print layer 3121, it is possible to prevent ink overflow during the process of printing the first decorative print layer 3121. That is, the second decorative print pattern 3140 may works as a bank layer defining the boundary DA-L between the display area DA and the non-display area NDA.

The thickness of the second decorative print pattern 3140 may be smaller than the thickness of the first decorative print layer 3121. The first decorative print layer 3121 may come in contact with the outer side surface 3140OS of the second decorative print pattern 3140 (e.g., during formation) and may flow over to the second decorative print layer 3140 such that the first decorative print layer 3121 may extend up to the upper surface of the second decorative print pattern 3140. It is to be noted that the first decorative print layer 3121 preferably covers only a part of the upper surface of the second decorative print pattern 3140 while exposing a part of the upper surface closer to the boundary DA-L between the display area DA and the non-display area NDA.

The second decorative print layer 3122 may be disposed on the first decorative print layer 3121. Both side surfaces 3122IS and 3122OS of the second decorative print layer 3122 may be located on the upper surface of the first decorative print layer 3122. That is, the second decorative print layer 3122 is not in contact with the second decorative print pattern 3140.

A shielding layer 3130 is disposed on the upper surface of the second decorative print layer 3122. The shielding layer 3130 extends inwardly from the upper surface of the second decorative print layer 3130 such that it may cover the inner side surface 222IS of the second decorative print layer 3122 and the inner side surface 222IS of the first decorative print layer 3122. Also in this case, the shielding layer 3130 does not go over the boundary DA-L between display area DA and the non-display area NDA.

The inner side surface 3130IS of the shielding layer 3130 may be located on the upper surface of the second decorative print pattern 3140. That is, the inner side surface 3140IS of the second decorative print pattern 3140 may protrude from the inner side surface 3130IS of the shielding layer 3130 toward the boundary DA-L between the display area DA and the non-display area NDA.

As a result, when the window 3100 is viewed from shielding layer 3130 and towards the surface 3110a of the transparent substrate 3110, the shielding layer 3130, a portion of the second decorative print pattern 3140 protruding from the inner side surface 3130IS of the shielding layer 3130, and a portion of the first decorative print layer 3121 protruding from the outer side surface 3130OS of the shielding layer 3130 are directly seen. That is, the portion of the first decorative print layer 3121 closer to the boundary DA-L between display area DA and the non-display area NDA is not seen.

In addition, if the first decorative print layer 3121 includes a metal-series material such as pearl, mirror and aluminum (Al) having a high reflectivity, there may be an error in recognizing an alignment key during the lamination process of the window 3100 and the display panel 1200, due to the first decorative print layer 3121. In this regard, by completely covering the inner portion of the first decorative print layer 3121 with the shielding layer 3130 as in this exemplary embodiment so that it is not seen from the outside, it is possible to improve (e.g., reduce or eliminate) such error in recognizing the alignment key due to the first decorative print layer 3121.

The inner side surface 3130IS of the shielding layer 3130 is not located more to the inside than the inner side surface 3140IS of the second decorative print pattern 3140. In other words, the inner side surface 3130IS of the shielding layer 3130 may be located on the upper surface of the second decorative print pattern 3140. The inner side surface 3140IS of the second decorative print pattern 3140 may protrude from the inner side surface 3121IS of the first decorative print layer 3121 more than the inner side surface 3140IS of the second decorative print pattern 3140 protrudes from the inner side surface 3130IS of the shielding layer 3130. For example, if the inner side surface 3140I8 of the second decorative print pattern 3140 protrudes from the inner side surface 3121IS of the first decorative print layer 3121 by approximately 0.2 mm, the inner side surface 3140IS of the second decorative print pattern 3140 may protrude from the inner side surface 3130IS of the shielding layer 3130 by approximately 0.1 mm. As a result, the shielding layer 3130 cannot be seen when viewed from the surface 3110a of the transparent substrate 3110.

Figure 15:
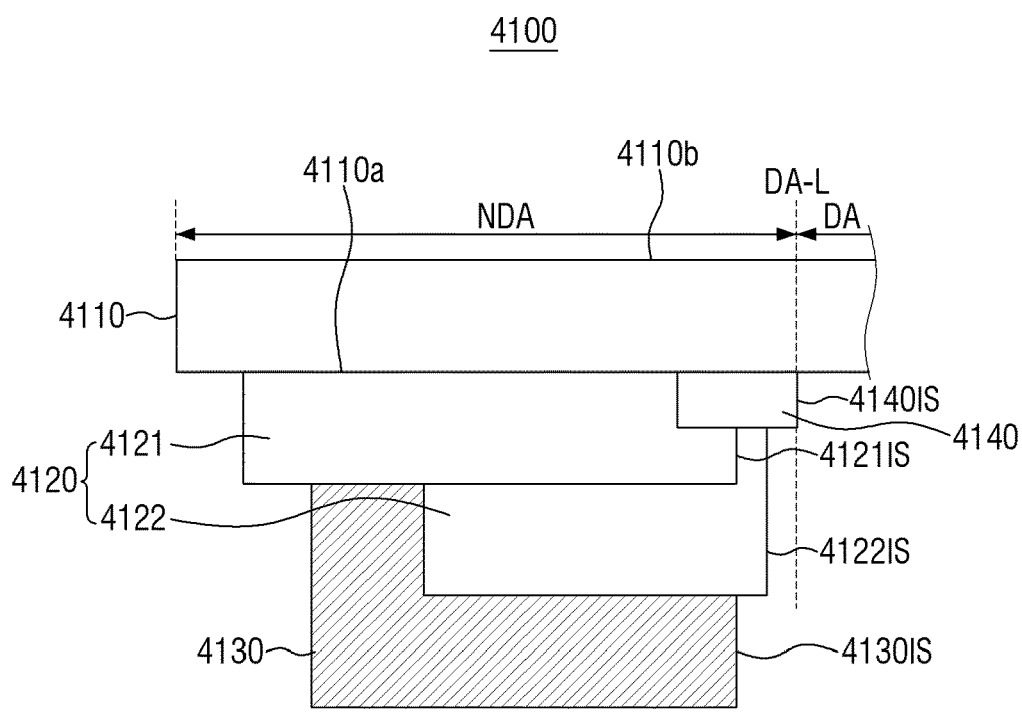
FIG. 15 is a cross-sectional view of a part of the window region A according to some embodiments of the present disclosure.

FIG. 15 is a cross-sectional view of a part of the window region A according to some embodiments of the present disclosure. The window 4100 shown in FIG. 15 employs the decorative print member 13 shown in FIG. 9.

The window 4100 according to the embodiments shown in FIG. 15 is different from that of the embodiments shown in FIG. 14 in that a second decorative print pattern 4122 covers the upper surface and the inner side surface 4121IS of the first decorative print layer 4121 near the boundary DA-L between the display area DA and the non-display area NDA. In the embodiments of FIG. 15, the structure of the first decorative print pattern 4120 and the shielding layer 4130 on the outer side of the window 4100 and the structure of the second decorative print pattern 4140 on the inner side of the window 4100 are identical to those of the embodiments of FIG. 14, and, therefore, the description thereof will not be provided again. The description of FIG. 15 will focus on the structure of the first decorated print pattern 4120 and the shielding layer 4130 at the boundary DA-L between the display area DA and the non-display area NDA.

Similarly to that shown in FIG. 14, the window 4100 according to FIG. 15 further includes a second print decorative pattern 4140 adjacent to the boundary DA-L between the display area DA and the non-display area NDA. The window 4110 according to this embodiment is different from that shown in FIG. 14 in that the inner side surface 4122IS of the second decorative print layer 4122 is located more to the inside than the inner side surface 4121IS of the first decorative print layer 4121.

That is, the inner side surface 4122IS of the second decorative print layer 4122 is located closer to the boundary DA-L between the display area DA and the non-display area NDA than the inner side surface 4121IS of the first decorative print layer 4121. The second decorative print layer 4122 may extend inwardly from the upper surface of the first decorative print layer 4121 and may cover the inner side surface 4121IS of the first decorative print layer 4121. When the boundary between the display area DA and the non-display area NDA is viewed from the surface 4110a of the transparent substrate 4110, inner upper surface and the inner side surface 4121IS of the first decorative print layer 4121 are not recognized. By doing so, it is possible to reduce an error in recognizing an alignment key due to the first decorative print layer 4121 as described above.

The second decorative print layer 4122 covers the inner upper surface and the inner side surface 4121IS of the first decorative print layer 4121, such that the inner side surface 4130IS of the shielding layer 4130 may be disposed at a desired position. For example, the inner side surface 4130IS of the shielding layer 4130 may be aligned with (e.g., coplanar with) the inner side surface 4122IS of the second decorative print layer 4122, or may be located more to the outside than the inner side surface 4122IS of the second decorative print layer 4122.

As described above, since the upper surface and the outer side surface of the second decorative print layer are covered with the shielding layer at the outer edge of the decorative print member, it is possible to prevent the second decorative print layer from being peeled off due to an external impact. Further, since the upper surface and the inner side surface of the first decorative print layer can be covered with the shielding layer or the second decorative print layer at the inner edge of the decorative print member, it is possible to reduce an error in recognizing an alignment key due to the first decorative print layer.

Although example embodiments of the present invention have been described, it is understood that the present invention is not limited to these example embodiments, but various changes and modifications can be made by one of ordinary skill in the art within the spirit and scope of the present invention as hereinafter claimed.

Therefore, the disclosed subject matter is not be limited to any single embodiment described herein, and the above-described embodiments are to be considered illustrative and not restrictive. Accordingly, the scope of the present inventive concept shall be determined only according to the attached claims, and equivalents thereof.

What is claimed is:

1. A decorative print member comprising:
a base layer having an upper surface and a lower surface opposite to the upper surface;
a first decorative print pattern on the base layer; and
a light shielding layer on the first decorative print pattern,
wherein the first decorative print pattern includes a first decorative print layer on the upper surface of the base layer, the first decorative print layer having an upper surface and a lower surface opposite to the upper surface; and a second decorative print layer on the upper surface of the first decorative print layer,
wherein the light shielding layer covers upper and side surfaces of the second decorative print layer,
wherein a side surface of the first decorative print layer protrudes outwardly with respect to the light shielding layer beyond the side surface of the second decorative print layer and a side surface of the light shielding layer, and a part of the upper surface of the first decorative print layer in direct contact with the second decorative print layer is exposed by the light shielding layer,
wherein the first decorative print pattern represents a chromatic color,
wherein the light shielding layer comprises resin including black pigment or gray pigment, and
wherein an entire lower surface of the first decorative print layer is directly on the base layer, or the entire lower surface of the first decorative print layer except an inner edge portion thereof is directly on the base layer.

2. The decorative print member of claim 1, wherein at least one side surface of the base layer protrudes outwardly from at least one of the side surfaces of the first decorative print layer.

3. The decorative print member of claim 1, wherein a width of the light shielding layer is smaller than a width of the first decorative print layer and larger than a width of the second decorative print layer.

4. The decorative print member of claim 1, wherein each of the first decorative print layer, the second decorative print layer, and the light shielding layer has an outer side surface and an inner side surface,
wherein the light shielding layer covers the outer side surface and the inner side surface of the second decorative print layer,
wherein the outer side surface of the first decorative print layer extends outwardly from the outer side surface of the second decorative print layer and the outer side surface of the light shielding layer, and
wherein the inner side surface of the first decorative print layer extends inwardly from the inner side surface of the second decorative print layer and the inner side surface of the light shielding layer.

5. The decorative print member of claim 4, further comprising: a second decorative print pattern on the base layer,
wherein the first decorative print layer contacts an outer side surface of the second decorative print pattern and covers at least a part of an upper surface of the second decorative print pattern.

6. The decorative print member of claim 5, wherein an inner side surface of the second decorative print pattern extends inwardly from the inner side surface of the first decorative print layer.

7. The decorative print member of claim 6, wherein the inner side surface of the light shielding layer extends inwardly from the inner side surface of the first decorative print layer, and
   wherein the inner side surface of the second decorative print pattern extends inwardly from the inner side surface of the light shielding layer.

8. The decorative print member of claim 6, wherein the inner side surface of the second decorative print layer extends inwardly from the inner side surface of the first decorative print layer, and
   wherein the inner side surface of the second decorative print pattern extends inwardly from the inner side surface of the second decorative print layer.

9. A display device, comprising:
   a display panel configured to display an image; and
   a window opposite to the display panel, the window including a display area for transmitting the image generated by the display panel and a non-display area surrounding the display area,
   wherein the window comprises:
      a transparent substrate having an upper surface and a lower surface opposite to the upper surface;
      a first decorative print pattern on the transparent substrate in the non-display area; and
      a light shielding layer over the first decorative print pattern,
      wherein the first decorative print pattern comprises:
      a first decorative print layer on the upper surface of the transparent substrate, the first decorative print layer having an upper surface and a lower surface opposite to the upper surface; and
      a second decorative print layer on the upper surface of the first decorative print layer,
   wherein the light shielding layer covers an upper surface and an outer side surface of the second decorative print layer,
   wherein an outer side surface of the first decorative print layer protrudes outwardly with respect to the light shielding layer beyond the outer side surface of the second decorative print layer and an outer side surface of the light shielding layer, and a part of the upper surface of the first decorative print layer in direct contact with the second decorative print layer is exposed by the light shielding layer,
   wherein the first decorative print pattern represents a chromatic color,
   wherein the light shielding layer comprises resin including black pigment or gray pigment, and
   wherein an entire lower surface of the first decorative print layer is directly on the transparent substrate, or the entire lower surface of the first decorative print layer except an inner edge portion thereof is directly on the transparent substrate.

10. The display device of claim 9, wherein an outer side surface of the transparent substrate protrudes outwardly more than the outer side surface of the first decorative print layer.

11. The display device of claim 9, wherein a width of the light shielding layer is smaller than a width of the first decorative print layer and larger than a width of the second decorative print layer.

12. The display device of claim 9, wherein the light shielding layer covers an inner side surface of the second decorative print layer, and
   wherein an inner side surface of the first decorative print layer extends inwardly from the inner side surface of the second decorative print layer and an inner side surface of the light shielding layer.

13. The display device of claim 9, further comprising: an adhesive element between the window and the display panel,
   wherein the adhesive element contacts a part of an upper surface of the light shielding layer, an inner side surface of the light shielding layer, the upper surface of the first decorative print layer protruding from an inner side surface of the second decorative print layer, and an inner side surface of the first decorative print layer.

14. The display device of claim 9, further comprising: a second decorative print pattern on the transparent substrate,
   wherein the first decorative print layer contacts an outer side surface of the second decorative print pattern and covers at least a part of an upper surface of the second decorative print pattern.

15. The display device of claim 14, wherein the second decorative print pattern extends outwardly from a boundary between the display area and the non-display area, and
   wherein an inner side surface of the second decorative print pattern extends inwardly from an inner side surface of the first decorative print layer.

16. The display device of claim 15, wherein the inner side surface of the light shielding layer extends inwardly from the inner side surface of the first decorative print layer, and
   wherein the inner side surface of the second decorative print pattern extends inwardly from the inner side surface of the light shielding layer.

17. The display device of claim 16, wherein the first decorative print layer comprises a material selected from pearl, mirror and aluminum (Al).

18. The display device of claim 15, wherein the inner side surface of the second decorative print layer extends inwardly from the inner side surface of the first decorative print layer, and
   wherein the inner side surface of the second decorative print pattern extends inwardly from the inner side surface of the second decorative print layer.

19. The display device of claim 18, wherein the first decorative print layer comprises a material selected from pearl, mirror and aluminum (Al).

20. A decorative print member comprising:
   a base layer having an upper surface and a lower surface opposite to the upper surface;
   a first decorative print pattern on the base layer; and
   a light shielding layer on the first decorative print pattern,
   wherein the first decorative print pattern includes a first decorative print layer on the upper surface of the base layer, the first decorative print layer having an upper surface and a lower surface opposite to the upper surface; and a second decorative print layer on the upper surface of the first decorative print layer,
   wherein the light shielding layer covers upper and side surfaces of the second decorative print layer,
   wherein a side surface of the first decorative print layer protrudes outwardly with respect to the light shielding layer beyond the side surface of the second decorative print layer and a side surface of the light shielding layer, and a part of the upper surface of the first decorative print layer in direct contact with the second decorative print layer is exposed by the light shielding layer,
   wherein a durability of the light shielding layer is higher than a durability of the first decorative print pattern, and wherein the first decorative print pattern has a wood pattern or a metal texture.

* * * * *